(12) United States Patent
Bøgh-Sørensen

(10) Patent No.: US 7,748,091 B2
(45) Date of Patent: Jul. 6, 2010

(54) COUPLING

(75) Inventor: Ole Bøgh-Sørensen, Hornslet (DK)

(73) Assignee: V. Guldmann A/S, Aarhus N (DK)

( * ) Notice: Subject to any disclaimer, the term of this patent is extended or adjusted under 35 U.S.C. 154(b) by 203 days.

(21) Appl. No.: 11/663,792

(22) PCT Filed: Sep. 21, 2005

(86) PCT No.: PCT/DK2005/000592

§ 371 (c)(1),
(2), (4) Date: Oct. 15, 2007

(87) PCT Pub. No.: WO2006/032274

PCT Pub. Date: Mar. 30, 2006

(65) Prior Publication Data
US 2008/0073903 A1 Mar. 27, 2008

(30) Foreign Application Priority Data
Sep. 23, 2004 (DK) ................................ 2004 01444

(51) Int. Cl.
*F16B 1/00* (2006.01)
(52) U.S. Cl. ................ 24/573.11; 24/635; 24/DIG. 53; 403/322.2
(58) Field of Classification Search ........................ None
See application file for complete search history.

(56) References Cited

U.S. PATENT DOCUMENTS

| | | | | |
|---|---|---|---|---|
| 2,647,798 A * | 8/1953 | Ballard | ........................ | 239/390 |
| 2,850,298 A * | 9/1958 | Clark | ..................... | 137/614.03 |
| 2,860,893 A * | 11/1958 | Clark | ............................. | 285/1 |
| 3,104,088 A * | 9/1963 | Cator | ....................... | 251/149.6 |
| 3,420,497 A * | 1/1969 | Wilcox | ..................... | 251/149.6 |
| 3,430,305 A * | 3/1969 | Geffner | ........................ | 24/603 |
| 3,667,566 A * | 6/1972 | Hopkins | ................... | 180/89.15 |
| 4,198,080 A * | 4/1980 | Carpenter | .................... | 285/277 |
| 4,366,945 A | 1/1983 | Blaeuenstein | | |
| 4,636,135 A * | 1/1987 | Bancon | ....................... | 414/730 |
| 4,709,454 A * | 12/1987 | Barnes | ..................... | 24/573.11 |
| 4,944,073 A * | 7/1990 | Haug | ......................... | 24/594.1 |
| 5,410,785 A * | 5/1995 | Huang | .......................... | 24/635 |
| 5,494,323 A * | 2/1996 | Huang | ........................ | 292/252 |

(Continued)

FOREIGN PATENT DOCUMENTS

EP     1359363     11/2003

(Continued)

*Primary Examiner*—Jack W. Lavinder
(74) *Attorney, Agent, or Firm*—James Creighton Wray; Meera P. Narasimhan

(57) ABSTRACT

The present invention concerns a coupling (1) including a first part (2) and a second part (3), where the first part (2) includes a housing (4) with a displaceable locking ring (8). The locking ring having a locking device (9) for receiving and fixing a projecting part (5). The housing is provided with an internal cylindrical surface with an annular recess (11) arranged for accommodating the locking device (9). The locking ring is connected with a spring-biased locking unit (17) for moving and locking the locking ring in at least two positions in the housing (4). The locking unit (17) includes an insert (18) connected to the locking ring (8) at one end and at an oppsoite end is provided with a number of oblique teeth (23).

12 Claims, 7 Drawing Sheets

U.S. PATENT DOCUMENTS

| | | | | |
|---|---|---|---|---|
| 5,530,999 A | * | 7/1996 | Barnes | 24/573.11 |
| 6,379,072 B1 | * | 4/2002 | Brown et al. | 403/31 |
| 6,568,382 B2 | * | 5/2003 | Martin et al. | 124/86 |
| 7,017,948 B2 | * | 3/2006 | Sunohara et al. | 285/244 |
| 7,258,539 B2 | * | 8/2007 | Lowe et al. | 425/192 R |
| 2002/0197105 A1 | * | 12/2002 | Chiang | 403/322.2 |
| 2004/0262917 A1 | * | 12/2004 | Sunohara et al. | 285/277 |
| 2009/0110477 A1 | * | 4/2009 | Seger | 403/376 |

FOREIGN PATENT DOCUMENTS

| | | |
|---|---|---|
| EP | 1533540 | 10/2004 |
| FR | 2106694 | 5/1972 |
| JP | 7229592 | 8/1995 |
| JP | 9264479 | 10/1997 |
| WO | WO 9015282 | 12/1990 |

* cited by examiner

COUPLING

This application claims the benefit of Danish Application No. PA 2004 01444 Sept. 23, 2004 and PCT/DK2005/000592 filed Sept. 21, 2005, which are hereby incorporated by reference in their entirety.

FIELD OF THE INVENTION

The present invention concerns a coupling including a first part and a second part, where the first part includes a housing in which is arranged a displaceable locking ring with locking means, where the locking ring in a known way is arranged for receiving and fixing a projecting part of the second part which is complementary to the locking ring, where the housing in an internal cylindric surface is provided with an annular recess which is arranged for accommodating the locking means, and where the locking ring is connected with a spring-biased locking unit which is arranged for moving and locking the locking ring in at least two positions in the housing.

BACKGROUND OF THE INVENTION

When assembling couplings for compressed air or water hoses, it is prior art to use couplings where there is arranged a displaceable locking ring with locking means (e.g. JP-A-09264479), which is adapted for accommodating and fixing a complementary projecting part, so that water, air or another medium may pass through the coupling.

It is a prerequisite that the coupling is designed so that it e.g. is watertight or airtight, entailing that different packings are to be used, and the coupling is to be made in a durable material, which in turn implies that the construction is very complicated and the costs of manufacture are high, which makes this type of coupling unsuited for use in areas where two objects are to be connected/fixed without a medium having to flow between them.

Furthermore, these couplings are to be provided with a closing mechanism so that the medium cannot flow freely from the moment the coupling is disconnected. As the medium is typically under high pressure and/or is flowing with great speed, the connecting and/or releasing is made difficult, as it may be difficult to move the locking ring sufficiently for the locking means to release the projecting part.

The couplings are not known either to be secure against tensile forces, as in their construction no extra safety mechanism is built in which prevents the locking means from disengaging the projecting part.

The couplings are therefore not usable when two apparatuses/units are to be coupled together, and the coupling is subjected to tensile forces.

OBJECT OF THE INVENTION

The purpose of the present invention is to provide a coupling with a simple construction, where the coupling may easily be used as a secure connecting joint between different objects and readily be coupled and released.

This is achieved with a coupling of the kind specified in the preamble of claim 1, where the locking unit includes an insert which at one end is connected to the locking ring, and which at an opposite end is provided with a number of series of continuing, oblique teeth, the insert having internal and external, respectively, axial projections, a guide ring surrounding the insert and having internally a design which is complementary to the axial projections, and being provided with a number of sets of oblique teeth disposed between the external projections, and a rotor provided at one end with a number of radial teeth and which at an opposite end is provided with a number of stops that interact with the internal projections, the rotor seated internally in the insert so that the teeth interact with the oblique teeth.

DESCRIPTION OF THE INVENTION

In the following, there is described a coupling which may be used primarily in the area of aiding means for e.g. transporting elderly, sick and/or heavy people in chairs/aprons which are movably fastened to e.g. rails in the ceiling. These aiding means are typically apparatuses/unit which are to be connected during transport, but which are to be separated when the person/apparatus has reached the final position. Therefore, it is to be remarked that the coupling according to the present invention may be used in other areas where it is required to secure two objects in a safe way, and that the coupling at the same time is to be easy and rapid to connect and disconnect.

The coupling according to the present invention utilises the known principle according to which the coupling comprises a first part and a second part, where the first part includes a housing in which is arranged a displaceable locking ring with locking means, and the second part includes a complementing projecting part, entailing that by means of the locking means the locking ring is adapted to receive and fix this complementing projecting part.

The locking means are arranged in the locking ring so that the locking means may in one position interact with a surrounding recess on the projecting part, irrespectively how the projecting part is inserted in the locking ring.

The new feature according to the present coupling is that the locking ring is connected with a spring-biased locking unit which is adapted to move and fix the locking ring in at least two position in the housing.

The spring-biased locking unit provides that the locking ring has:
  a first position where the locking means is provided in a projecting position and thereby interact with the surrounding recess on the projecting part and thus prevent the coupling from separating;
  a second position where the locking means are brought into a retracted position whereby the projecting part may freely be passed through the locking ring;
  a third position where the locking means are provided in a projecting position and thereby interact with the surrounding recess on the projecting part, whereby it is prevented that the coupling separates.

When the coupling is separated, the locking ring is in the second position where it is possible to insert the projecting part, after which the insertion actuates the locking unit so that the locking ring is brought into the first position where the locking means are provided in a projecting positions and thereby interact with the surrounding recess on the projecting part, whereby it is prevented that the coupling is separated.

In order to release the coupling, the projecting part is actuated with compressive force acting on the locking unit and bringing the locking unit in the third position where the locking means are still in projecting position, and subsequently the tensile force entails that the locking ring is brought back to the second position where the locking means are in retracted position, and thereby removal of the projecting part from the locking ring is enabled.

In order to ensure fixing of the coupling and correct release so that a first inserting of the projecting part in the locking ring causes fixing of the projecting part and subsequent activation of the projecting part which entails release of the projecting part, the locking unit includes an insert which at one end is connected to the locking ring, and which at an opposite end is provided with a number of series of continuing, oblique teeth, the insert having internal and external axial projections, respectively, a guide ring surrounding the insert and having internally a design which is complementary to the axial projections, and being provided with a number of sets of oblique teeth disposed between the external projections, and is provided with a rotor at one end with a number of radial teeth and which at an opposite end provided with a number of stops that interact with the internal projections, the rotor seated internally in the insert so that the teeth interact with the oblique teeth.

The locking unit with the three components—insert, guide ring and rotor—ensure that the locking ring is moved axially internally in the housing between different positions so that the locking means are either in retracted position, so that the projecting part may freely be moved into and out of the locking ring, or is in a projecting position so that it is prevented that the projecting part may be moved into and out of the locking ring or interact with the surrounding recess on the projecting part.

The construction itself, with insert, guide ring and rotor, entails that the two functions—fixing and releasing—are effected easily and without problems, since the rotor alternatingly and/or simultaneously is resting on the oblique teeth of both the insert and the guide ring, and is rotating when the insert is moved axially in relation to the guide ring.

The rotation is caused by the radial teeth of the rotor being designed with an inclining contact surface which is arranged to abut on the oblique teeth of the insert as well as the guide ring, and that the oblique teeth of the insert and the guide ring are continuing so that the radial teeth of the rotor e.g. are supported by the teeth of the insert until the axial movement of the insert entails that the teeth of the guide ring pass by the teeth of the insert and thereby force the radial teeth of the rotor to move up along the teeth of the insert, whereby the rotor subsequently rotates when the teeth of the guide ring are lowered and pass by the teeth of the insert, and the design of the radial teeth of the rotor, the contact surfaces of which are oblique, provide that the rotor rotates and advances so that it comes to rest at a new position in the teeth of the insert.

In order to avoid that the construction becomes a complicated construction, where the rotor after each fixing/releasing cycle is to be returned to the original position, the guide ring is provided with a number of sets of oblique teeth, and the insert is provided with a number of series of continuing oblique teeth. Since the number of sets of oblique teeth both correspond to the number of series of continuing oblique teeth and the number of radial teeth, it is possible to achieve a continuous cycle with alternating fixing and releasing of the projecting part while the rotor continues the rotation around in the locking ring in the same direction.

The rotor is provided with a number of stops which interact with internal projections in the insert. This provides that when the rotor rotates due to interaction between the oblique teeth of the rotor and the inclining contact surface of the rotor teeth, then there are positions where the rotor stops opposite the internal projections of the insert, whereby the insert is fixed in the rotor, the teeth of which resting on the oblique teeth of the guide ring, causing that the locking ring is prevented from reaching a position where the locking means may be released.

In order that the two parts of the coupling are held together during use, the locking means are constituted by locking balls or locking rollers which are adapted for engaging a surrounding recess on the projecting part. If locking balls are used, the locking ring is typically provided with a number of openings in which there is disposed a locking ball.

These openings may be conically shaped so that the locking ball does not go through the opening and e.g. into the coupling. The openings may furthermore be designed so that they may partly accommodate the locking balls, and the locking balls may be moved radially, whereby the locking balls are in a retracted position where part of the locking balls are disposed in the annular recess in the housing, whereby it is enabled that the projecting part may freely be passed through the locking ring. The locking balls may also be in projecting position where a part of each locking ball is projecting internally in the locking ring and may thereby interact with the surrounding recess on the projecting part.

According to an alternative embodiment of the present invention, the locking means are locking rollers which are either disposed perpendicularly to the projecting part or in parallel with the projecting part when it is inserted in the locking ring. The horizontally disposed locking rollers are arranged in connection with the housing/locking ring of the coupling, so that they move laterally towards each other and by compression may interact with the surrounding recess on the projecting part.

The vertically disposed locking rollers are designed so that their maximum length correspond to the surrounding recess on the width of the projecting part. Otherwise, they act in the same way as the locking balls. This means that in projecting position they may interact with the surrounding recess on the projecting part, while in the retracted position enable the projecting part to be passed freely through the locking ring.

Other, similar locking means are possibly used for fixing the projecting part, e.g. a claw with a number of fingers that grip about the projecting part and interact with the surrounding recess.

According to an embodiment of the present invention, the second part of the coupling is designed so that it consists of two parts—a projecting part which is provided with a central drilled hole which is adapted to accommodate and enclose the second part of the coupling, namely a locking rod. This will entail that e.g. the first part of the coupling may be secured to a travelling trolley, while the projecting part is fastened to a hoisting apparatus. The locking rod, which is connected to the travelling trolley, is lowered to the hoisting apparatus and is fastened so that the entire hoisting apparatus may be lifted up to the travelling trolley, and the two parts of the coupling may be coupled together so that the hoisting apparatus is securely connected with the travelling trolley.

In order to lower the locking rod from the first part of the coupling and down to the surrounding projecting part, the coupling is provided with an axial passage so that a cord, a cable or the like may be drawn through and thereby secure the locking rod. This entails that the first part of the coupling may be provided with a travelling trolley and a locking rod under the travelling trolley, which simultaneously different objects may be provided with a projecting part that fits the locking rod, entailing that by means of one and the same travelling trolley one may lift/move various objects from one place to another in a building.

As the coupling is to be usable with different types of objects and units, it is of importance that it is mounted securely to these objects/items. Therefore, the projecting part and/or the housing are/is connected to a connecting flange. This entails that the connecting flanges are used for achieving secure fastening of the objects/units via e.g. welding, gluing, screws or bolts.

An alternative to connecting the housing and/or the projecting part to a connecting flange may e.g. be:

to connect the housing with a strap holder, a hook, a second part of another coupling, a chain, a travelling trolley, a wire and the like;

to connect the projecting part with a strap holder, a hook, a first part of another coupling, a chain, a wire and the like.

There are many different combinations, entailing that the coupling may be used for different applications, e.g. a travelling trolley, a bracket, an apron and similar.

In order to ensure that the first and second parts of the coupling are not separated by accident by inadvertent upwards action on the second part of the coupling, the housing is designed with a safety mechanism which can be activated mechanically or automatically, so that the locking ring of the coupling cannot be moved axially, or the locking means cannot be moved in the annular recess in the internal cylindric surface.

The said safety mechanism may, according to one embodiment, be a locking pin or a locking ball which is disposed in one of the sidewalls of the housing, and which interacts with a recess in the locking ring and an outer, displaceable actuation ring which in one position enables disposition of the locking pin/locking ball in the sidewall of the housing, whereby the locking ring may be moved freely, and in a second position press the locking pin/locking ball into the recess of the locking ring and thereby prevent axial movement of the locking ring.

According to a second embodiment of the invention, the safety mechanism may be a unit which in one position fill the annular recess in the internal cylindric surface, so that the locking means cannot be released, and which in a second position enables formation of the annular recess in the internal cylindric surface so that the locking means can interact with the annular recess.

The orientation of the coupling does not concern the function of the coupling, however, the first part will typically be disposed at the top and the second part with the projecting part disposed at the bottom in case of vertical positioning, as vertical positioning implies reduced risk of dirt penetrating into the second part and possibly preventing the locking ring from moving.

The coupling according to the present invention may possibly be used for:

joining several wires if a wire is to be extended;

securing containers where the parts of the coupling may be mounted in the corners of the container.

DESCRIPTION OF THE DRAWINGS

The invention is explained in more detail in the following with reference to the Figures, wherein:

FIGS. 4-6 show the movement of a locking ring in the first part of the coupling.

Figure 1:
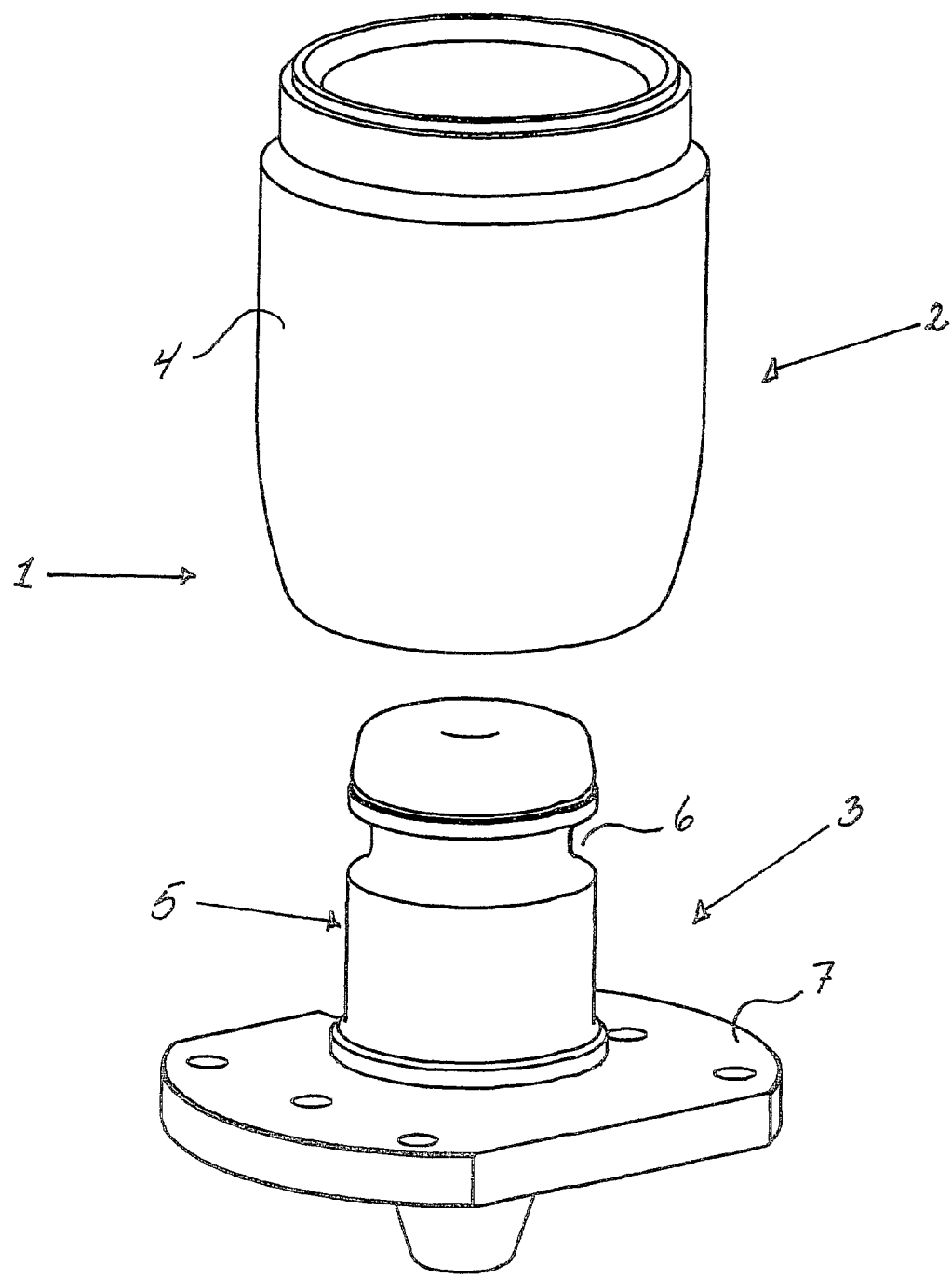
FIG. 1 shows a perspective view of a coupling according to the invention.

The reference numbers on the Figures refer to the following:

1. Coupling
2. A first part
3. A second part
4. Housing
5. Projecting part
6. Surrounding recess
7. Connecting flange
8. Locking ring
9. Locking ball
10. Opening
11. Annular recess
12 Central drilled hole
13. Locking rod 13
14. recess
15. Lower inner side
16. Upper inner side
17. Locking unit
18. Insert
19. Guide ring
20. Rotor
21. Spring
22. Flange
23. Oblique teeth
24. Internal projections
25. External projections
26. Oblique teeth
27. Projections
28. Radial teeth 28
29. Stop
30. Inclining contact surface

DETAILED DESCRIPTION OF THE INVENTION

FIG. 1 shows a perspective view of a coupling 1 that includes a first part 2 and a second part 3, where the first part 2 comprises a housing 4, and where the second part 3 comprises a projecting part 5 with a surrounding recess 6 and a connecting flange 7.

Figure 2:
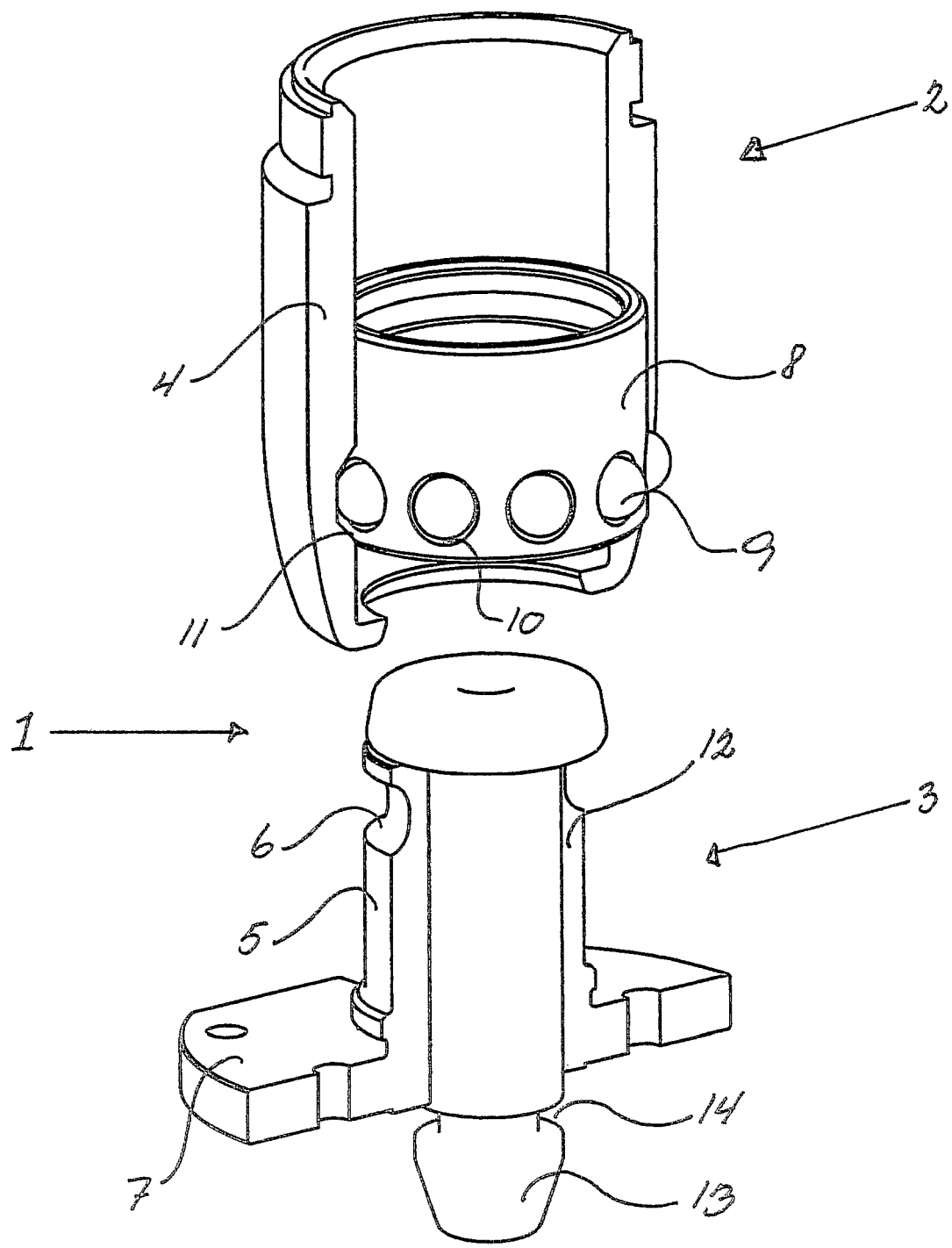
FIGS. 2-3 show a cross-section of the coupling in FIG. 1.

FIG. 2 shows a cross-section of the coupling 1 in FIG. 1, from which appears that the first part 2 includes the housing 4 in which there is arranged an axially displaceable locking ring 8 with openings 10, where in each opening 10 there is provided a locking ball 9. The locking ring 8 is shown in a position where the locking balls 9 are brought into a retracted position, interacting with the annular recess 11 in the housing 4 so that the projecting part 5 may be passed freely through the locking ring 8.

The second part 3 includes the projecting part 5 with the surrounding recess 6 and a central drilled hole 12 in which a locking rod 13 is disposed. The locking rod 13 continues through the connecting flange 7 and is provided with a recess 14 to which an apparatus (not shown) can be secured.

According to the shown embodiment of the second part 3, it is possible to secure the connecting flange 7 to an apparatus (not shown), whereby only the locking rod 13 is lowered/elevated. Only when the locking rod 13 is coupled to an apparatus (not shown) by means of recess 14, the apparatus is elevated (not shown), and the projecting part 5 is brought into connection with locking ring 8.

Figure 3:
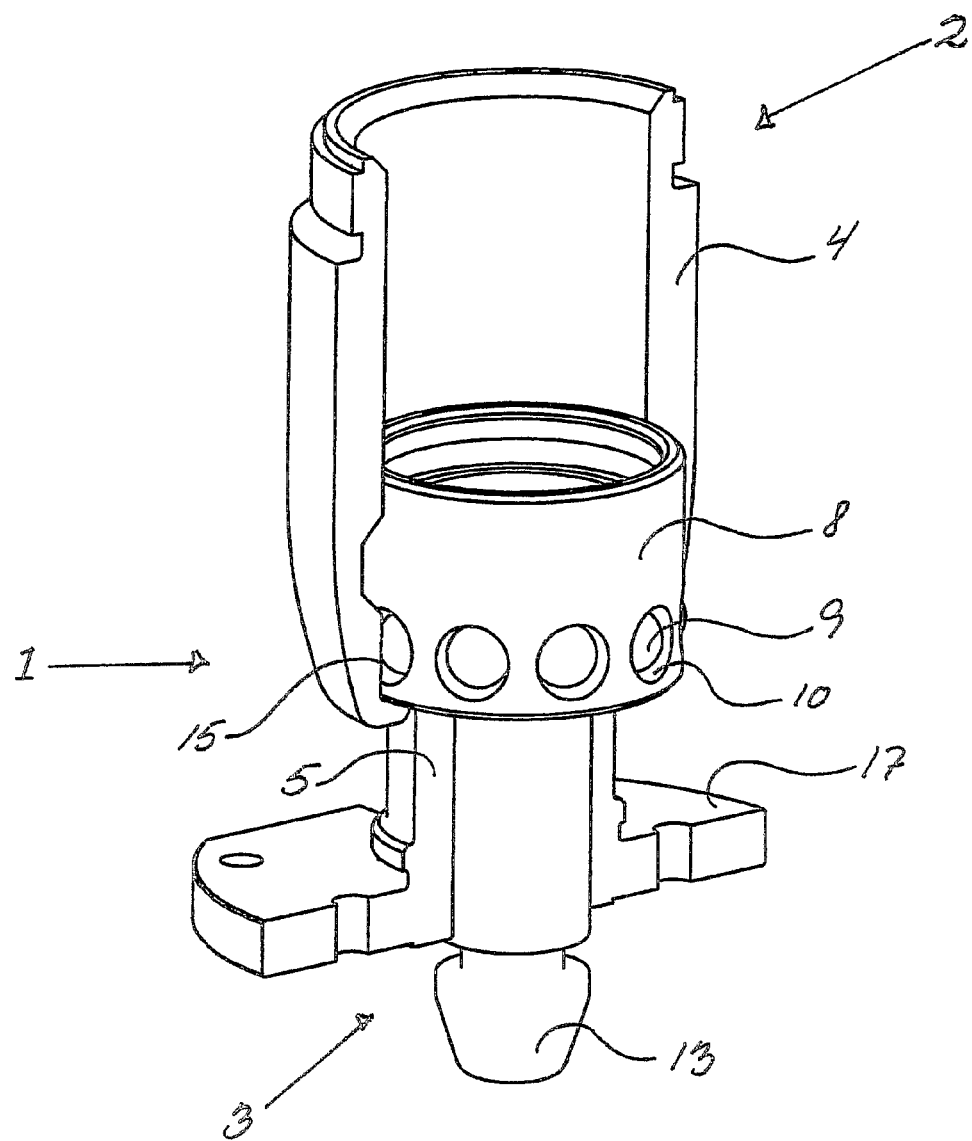

FIG. 3 shows a cross-section of the coupling in FIG. 1. From this appears that the second part 3 is inserted in locking ring 8 which is in a position where the locking balls 9 are pressed into a projecting position from lower side of wall 15 of the housing 4, so that the locking balls 9 interact with the surrounding recess (not shown) of the projecting part 5.

Figure 4:
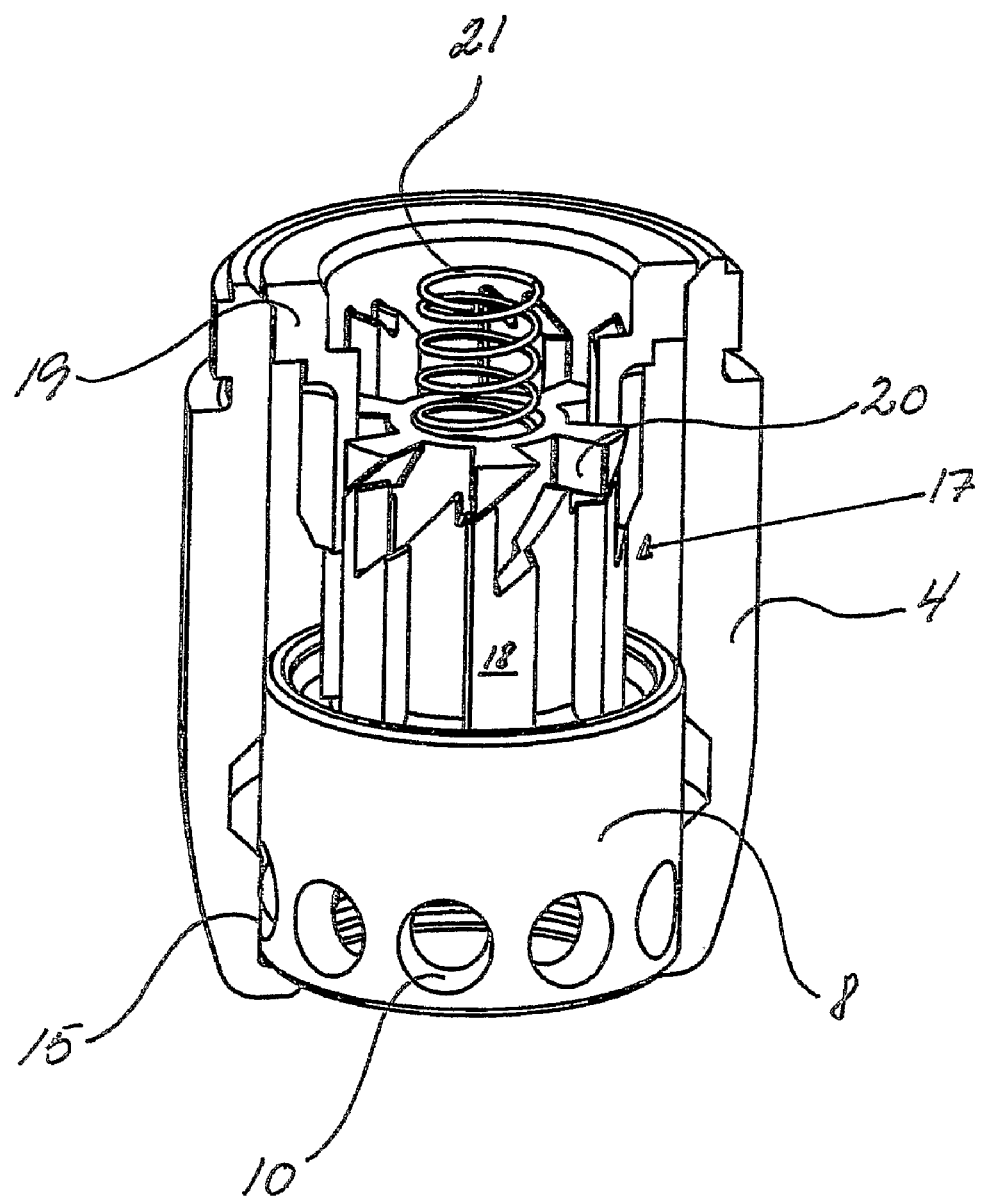
Figure 6:
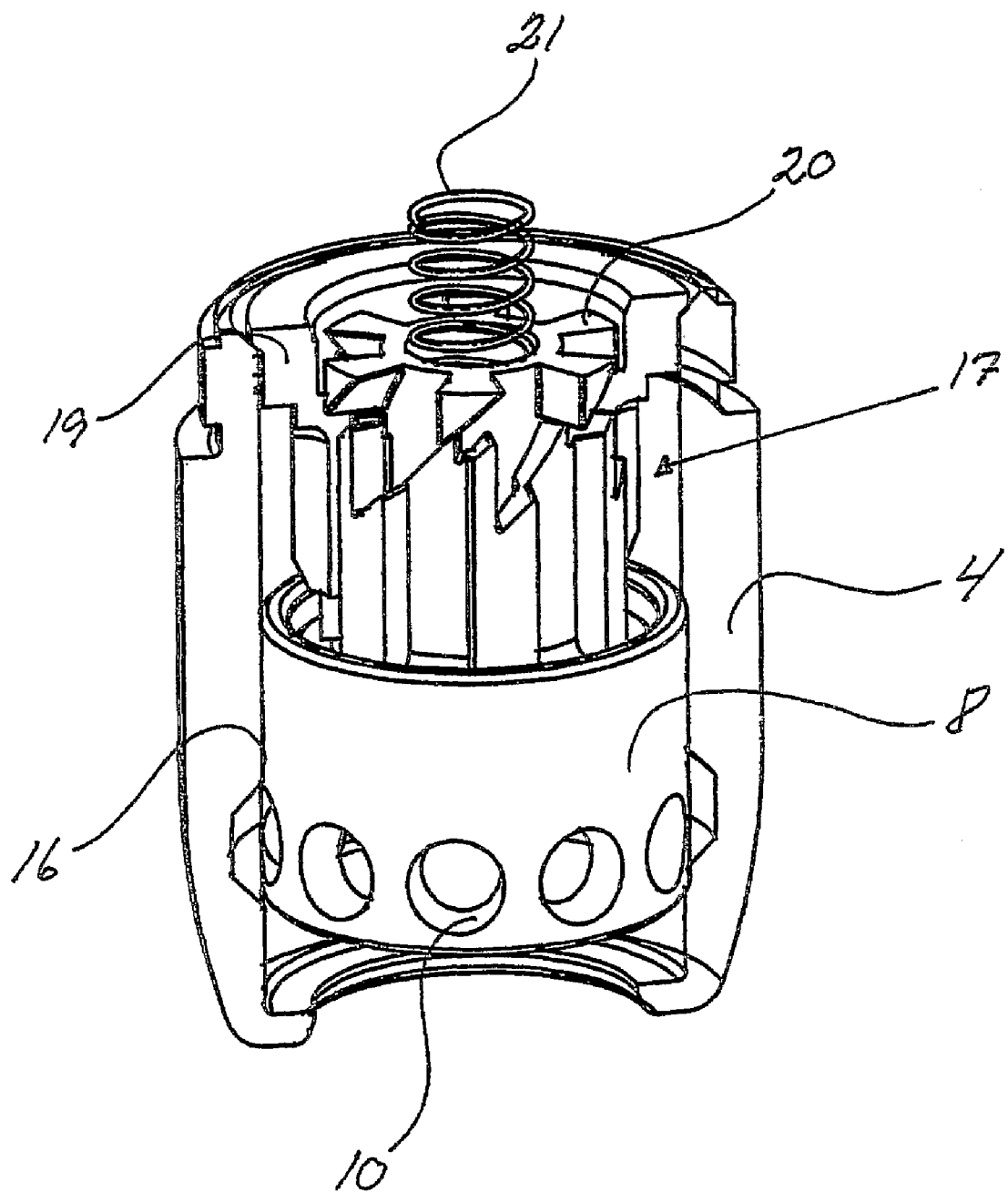
Figure 6:
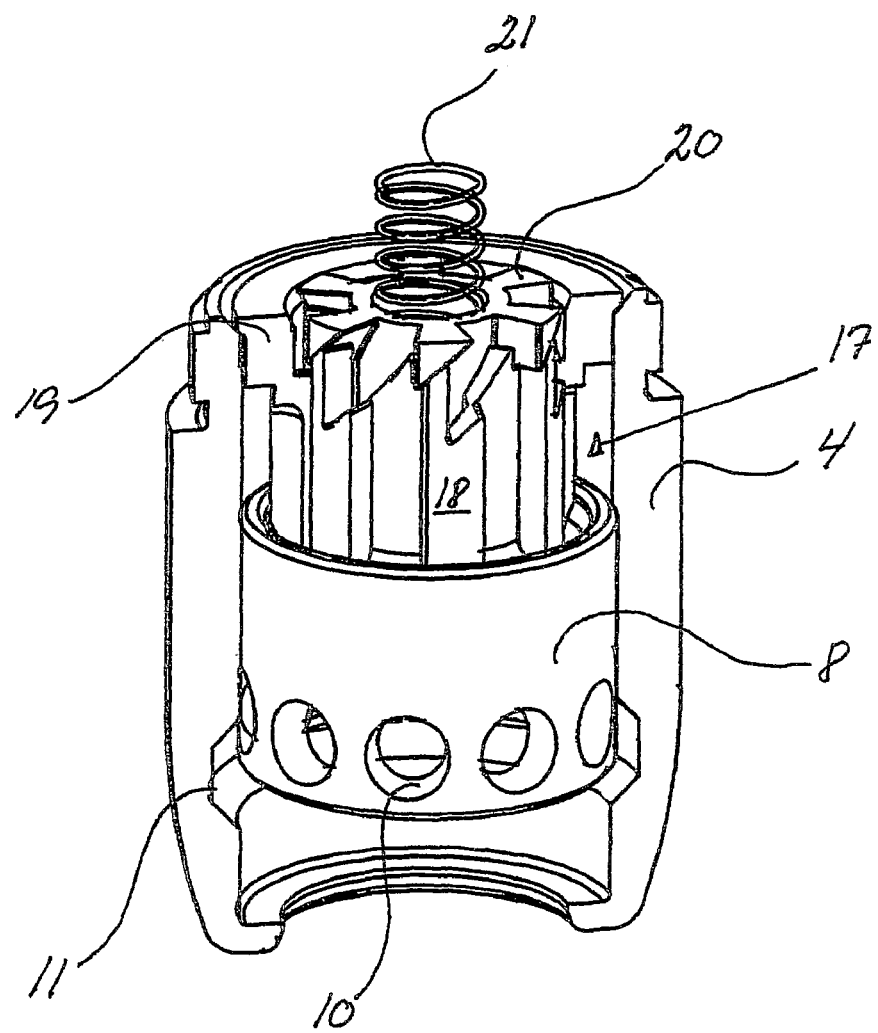

FIGS. 4-6 show the movement of a locking ring 8 in the housing 4, where

FIG. 4 shows the locking ring 8 in a first position, where the openings 10 of the locking ring 8 is disposed opposite a lower inner side 15 of the housing 4, entailing that the locking balls (not shown) are in projecting position and are either interacting with the surrounding recess (not shown) on the projecting part (not shown), or prevent insertion of the projecting part (not shown);

FIG. 5 shows the locking ring 8 in a second position, where the openings 10 of the locking ring 8 are disposed opposite the annular recess 11, entailing that the locking balls (not shown) are in retracted position and thereby enable inserting and extracting the projecting part (not shown);

FIG. 6 shows the locking ring 8 in a third position, where the openings 10 of the locking ring 8 are disposed opposite an upper inner side 16 of the housing 4, entailing that the locking balls (not shown) are in projecting position and are interacting with the surrounding recess (not shown) on the projecting part (not shown).

In FIGS. 4-6 it is furthermore possible to see the locking unit 17 which comprises an insert 18, a guide ring 19 and a rotor 20, where the guide ring 19 is connected to an upper edge of the housing 4, and the rotor 20 is actuated by a spring 21 which provide for the rotor 20 to pressed down towards locking ring 8.

Figure 7:
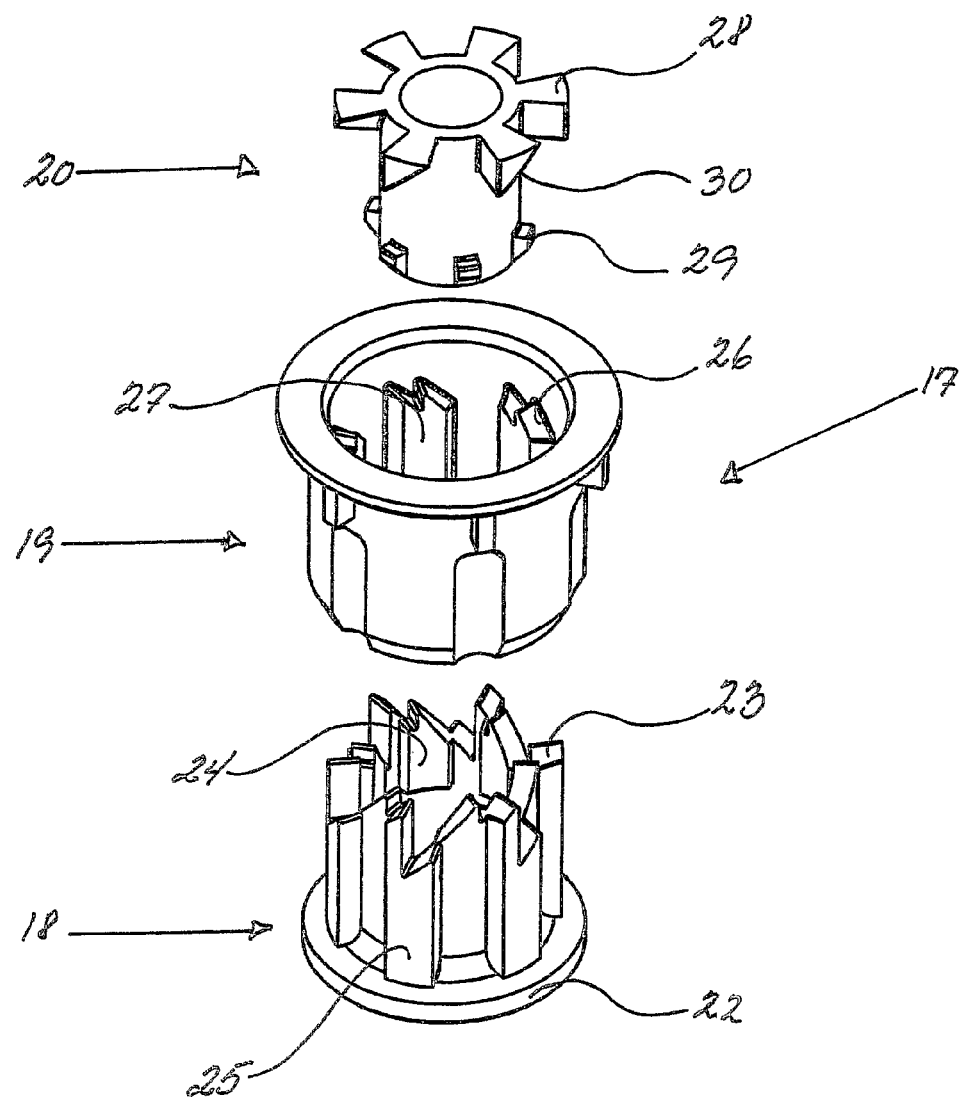
FIG. 7 shows a locking unit.

FIG. 7 shows a locking unit 17 comprising an insert 18, a guide ring 19 and a rotor 20;
- where the insert 18 at one end is provided with a flange 22 which is connected to the locking ring (not shown), and which at an opposite end is provided with a number of series of continuing, oblique teeth 23, and which has axial internal projections 24 and external axial projections 25;
- where guide ring 19 encloses insert 18 and is internally provided with a number of sets of oblique teeth 26 which are arranged on projections 27, which, when guide ring 19 enclose insert 18, are disposed between the external projections 25;
- where rotor 20 at one end is provided with a number of radial teeth 28, and at an opposite end provided with a number of stops 29 which, when rotor 20 is seated in insert 18, interact with internal projections 24, and where the radial teeth 28 are designed with an inclining contact surface 30 that interacts with the oblique teeth 23, 26 of insert 18 and guide ring 19, causing rotor 20 to rotate.

The invention claimed is:

1. A coupling (1) including a first part (2) and a second part (3), where the first part (2) includes a housing (4) in which is arranged a displaceable locking ring (8) with locking means (9), where the locking ring (8) in a known way is arranged for receiving and fixing a projecting part (5) of the second part (3) which is complementary to the locking ring (8), where the housing (4) of said first part in an internal cylindric surface is provided with an annular recess (11) which is arranged for accommodating the locking means (9), and where the locking ring (8) is connected to a spring-biased locking unit (17) which is arranged for moving and fixing the locking ring (8) in at least two positions in the housing (4), wherein the locking unit 17 includes
   an insert (18) which at one end is connected to the locking ring (8), and which at an opposite end is provided with a number of series of, oblique teeth (23), the insert (18) having internal and external axial projections (24, 25), respectively,
   a guide ring (19) surrounding the insert (18) and having internal axial projections (27) complementary to the external axial projections (25), said internal axial projections (27) being provided with a number of sets of oblique teeth (26) disposed at one end of said internal axial projections (27), and
   a rotor (20) provided at one end with a number of radial teeth (28) and at an opposite end provided with a number of stops (29) that interact with the internal projections (24) of said rotor, the rotor (20) is seated internally in the insert (18) so that the radial teeth (28) interact with the oblique teeth (23, 26) of said insert (18) and said guide ring (19).

2. Coupling (1) according to claim 1, wherein the locking means (9) are constituted by locking balls or locking rollers which are adapted for engaging a surrounding recess (6) on the projecting part (5).

3. Coupling (1) according to claim 1, wherein the projecting part (5) is designed with a central drilled hole (12).

4. Coupling (1) according to claim 1, wherein the projecting part (5) is connected to a connecting flange (7).

5. Coupling (1) according to claim 1, wherein the housing (4) is connected to a connecting flange.

6. Coupling (1) according to claim 1, wherein the housing (4) is designed with a safety mechanism.

7. A coupling comprising a first part and a second part, the first part comprising a housing and a displaceable locking ring including a locking means disposed in the housing, the second part comprising a projecting part complementary to the locking ring, wherein the locking ring receives and holds the projecting part, the housing including an internal cylindrical surface, an annular recess on the internal cylindrical surface for accommodating the locking means, a spring-biased locking unit connected to the locking ring for moving and fixing the locking ring in at least two positions in the housing, the spring-biased locking unit comprising an insert having first and second opposite ends, the first end being connected to the locking ring and the second end comprising a plurality of series of oblique teeth, the insert further comprising internal and external axial projections respectively, the spring-biased locking unit further comprising a guide ring surrounding the insert and having interior axial projections complementary to the external axial projections of the insert, the interior axial projections comprising a plurality of sets of oblique teeth disposed at an end of the interior axial projections, and the spring-biased locking unit also comprising a rotor having one and opposite other ends, a plurality of radial teeth on the one end and a plurality of stops on the other end, internal projections on the rotor interacting with the plurality of stops, wherein the rotor is disposed inside the insert and wherein the radial teeth of the rotor interact with the series of oblique teeth of the insert and the sets of oblique teeth of the guide ring.

8. The coupling of claim 7, wherein the projecting part comprises a surrounding recess and wherein the locking means comprises locking balls or locking rollers, and wherein the locking balls or the locking rollers engage the surrounding recess.

9. The coupling of claim 7, wherein the projecting part comprises a central drilled hole.

10. The coupling of claim 7, further comprising a connecting flange, wherein the projecting part is connected to the connecting flange.

11. The coupling of claim 7, further comprising a connecting flange, wherein the housing is connected to the connecting flange.

12. The coupling of claim 7, wherein the housing further comprises a safety mechanism.

* * * * *